(12) United States Patent
Yamazaki et al.

(10) Patent No.: US 7,717,640 B2
(45) Date of Patent: May 18, 2010

(54) JOINT STRUCTURE OF PIPE

(75) Inventors: Tsunehiko Yamazaki, Aichi pref. (JP); Naoomi Miyakawa, Aichi pref. (JP)

(73) Assignee: Yamazaki Mazak Corporation, Aichi pref. (JP)

( * ) Notice: Subject to any disclaimer, the term of this patent is extended or adjusted under 35 U.S.C. 154(b) by 87 days.

(21) Appl. No.: 11/538,834

(22) Filed: Oct. 5, 2006

(65) Prior Publication Data

US 2008/0012311 A1    Jan. 17, 2008

(30) Foreign Application Priority Data

Oct. 17, 2005    (JP) .............................. 2005-301233

(51) Int. Cl.
*F16D 3/00* (2006.01)
(52) U.S. Cl. ...................... 403/219; 403/169; 403/173; 403/217
(58) Field of Classification Search ................ 403/169, 403/170, 171, 174, 176, 237, 267, 270–272, 403/364, 381, 382, 217–219; 138/120; 296/29
See application file for complete search history.

(56) References Cited

U.S. PATENT DOCUMENTS

| | | | | | |
|---|---|---|---|---|---|
| 603,244 | A | * | 5/1898 | Avery | ......................... 403/272 |
| 616,073 | A | * | 12/1898 | Brennan | ...................... 403/170 |
| 1,450,935 | A | * | 4/1923 | Anderson | ................... 403/270 |
| 1,867,226 | A | * | 7/1932 | Martin | ........................ 403/171 |
| 1,972,309 | A | * | 9/1934 | McMurchy | ................. 403/282 |
| 3,751,792 | A | * | 8/1973 | Frakes | ........................ 403/237 |
| 4,099,887 | A | | 7/1978 | Mackenroth | |
| 5,190,207 | A | * | 3/1993 | Peck et al. | .................. 403/272 |
| 5,249,818 | A | * | 10/1993 | Patterson | .................... 403/252 |
| 5,595,203 | A | * | 1/1997 | Espinosa | |
| 5,700,102 | A | * | 12/1997 | Feleppa | ...................... 403/170 |
| 6,079,181 | A | * | 6/2000 | Ruff | |
| 6,085,481 | A | * | 7/2000 | Lee | |
| 6,634,076 | B2 | * | 10/2003 | Hjertman et al. | ............ 138/120 |
| 7,337,791 | B1 | * | 3/2008 | Belanger et al. | |

FOREIGN PATENT DOCUMENTS

| | | |
|---|---|---|
| DE | 2 310 375 | 9/1974 |
| DE | 8202245 U * | 5/1982 |
| DE | 202 06 222 | 9/2002 |
| DE | 103 24 153 | 12/2004 |
| EP | 0 355 253 | 2/1990 |

(Continued)

*Primary Examiner*—Victor MacArthur
(74) *Attorney, Agent, or Firm*—Renner, Otto, Boisselle & Sklar, LLP

(57) ABSTRACT

A joint structure for directly joining a plurality of pipes is provided. A first pipe 10 has a joined end face 11 obtained by laser machining at a predetermined angle to an axis and a tenon 12 formed on a joined end face. A second pipe 20 has a joined end face 21 obtained by laser machining at a predetermined angle to an axis and a mortice 22. By fitting the tenon 12 of the first pipe 10 to the mortice 22 of the second pipe 20, a joint structure of the two pipes 10, 20 is formed. The joined end face 11 of the first pipe 10 and the joined end face 21 of the second pipe 20 are on surface contact over the entire thickness of the pipe.

4 Claims, 8 Drawing Sheets

FOREIGN PATENT DOCUMENTS

| | | | |
|---|---|---|---|
| GB | 855161 | * | 11/1960 |
| GB | 1189303 | | 4/1970 |
| JP | 05-295800 | | 11/1993 |
| JP | 2001-165126 | | 6/2001 |
| WO | WO 9507835 A1 | * | 3/1995 |
| WO | WO 9962669 A1 | * | 12/1999 |

* cited by examiner

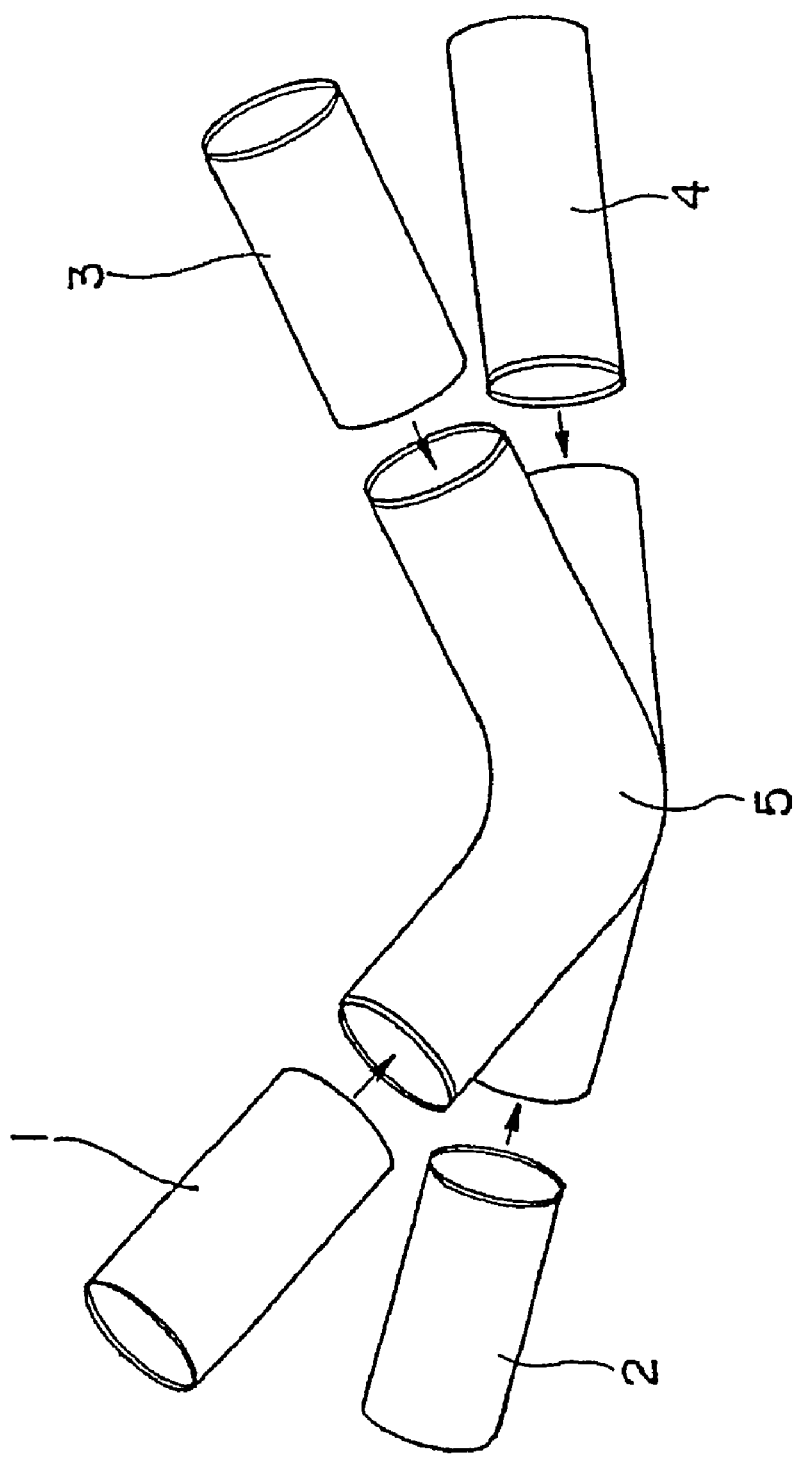

JOINT STRUCTURE OF PIPE

The present application is based on and claims priority of Japanese patent application No. 2005-301233 filed on Oct. 17, 2005, the entire contents of which are hereby incorporated by reference.

BACKGROUND OF THE INVENTION

1. Field of the Invention

The present invention relates to a joint structure of a pipe.

2. Description of the Related Art

FIG. 7 is a perspective view showing a conventional joint structure of a pipe, and FIG. 8 is a block diagram of parts.

In the conventional joint structure for connecting ends of four pipes to each other, for example, a pipe 1, a pipe 2, a pipe 3 and a pipe 4 are prepared and a joint member 5 is prepared as a separate member, and after each of the pipes are abutted to the joint member 5, welding $W_1$ is performed at joined portions to join them.

That is, it is structurally difficult to directly join the ends of the four pipes to each other, and the joint member 5 is required. This joint member 5 is made by forging of a steel material, for example.

For welding to be conducted at the joined portion, beveling machining is needed on the pipes and the joint member.

The joint structure of a pipe structure is disclosed in Japanese Patent Laid-Open Publication No. 05-295800 and Japanese Patent Laid-Open Publication No. 2001-165126.

Use of a joint member was indispensable in the above-mentioned conventional structure.

Therefore, an object of the present invention is to provide a joint structure of a pipe which can directly join ends of a plurality of pipes.

SUMMARY OF THE INVENTION

In order to achieve the above object, the joint structure of a pipe of the present invention comprises a tenon formed on a joined end face of a first pipe and a mortice formed on a joined end face of a second pipe, and the joined end face of the first pipe and the joined end face of the second pipe are in surface contact and joined to each other by fitting the tenon and the mortice with each other.

Moreover, the plurality of pipes provided with the mortice formed on the outer circumferential surface of the first pipe, the mortice formed on the outer circumferential surface of the second pipe, and tenons formed on the joined end faces are brought into surface contact with the outer circumferences of the first pipe and the second pipe and joined to each other by fitting the tenons to the mortice of the first pipe and the mortice of the second pipe.

Also, the joined end face of the pipe, the tenon and the mortice are formed by laser machining.

The joint structure of a pipe of the present invention is provided with the above means and ends of a plurality of pipes can be collected at one location and joined to each other without requiring a joint member. Thus, the entire structure can be constructed with a light weight, and the number of processes required for assembling can be drastically reduced.

Moreover, since the end faces of the pipes are joined to the other party in surface contact, a joint structure with high rigidity can be obtained.

BRIEF DESCRIPTION OF THE DRAWINGS

FIG. 8 is an explanatory view showing a conventional joint structure of a pipe.

DETAILED DESCRIPTION OF THE PREFERRED EMBODIMENTS

Figure 1:
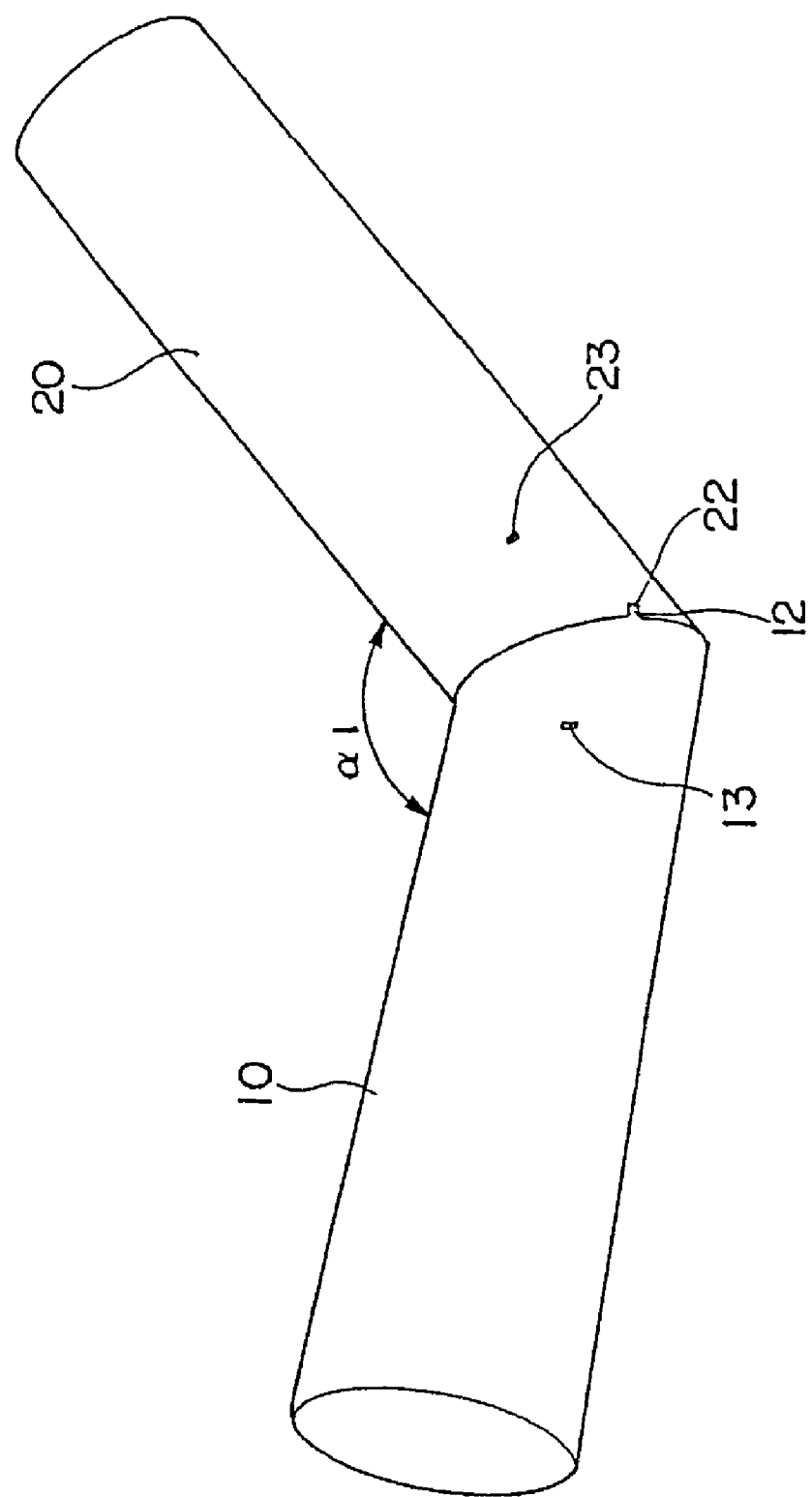
FIG. 1 is a perspective view showing a joint structure of two pipes.
Figure 2:
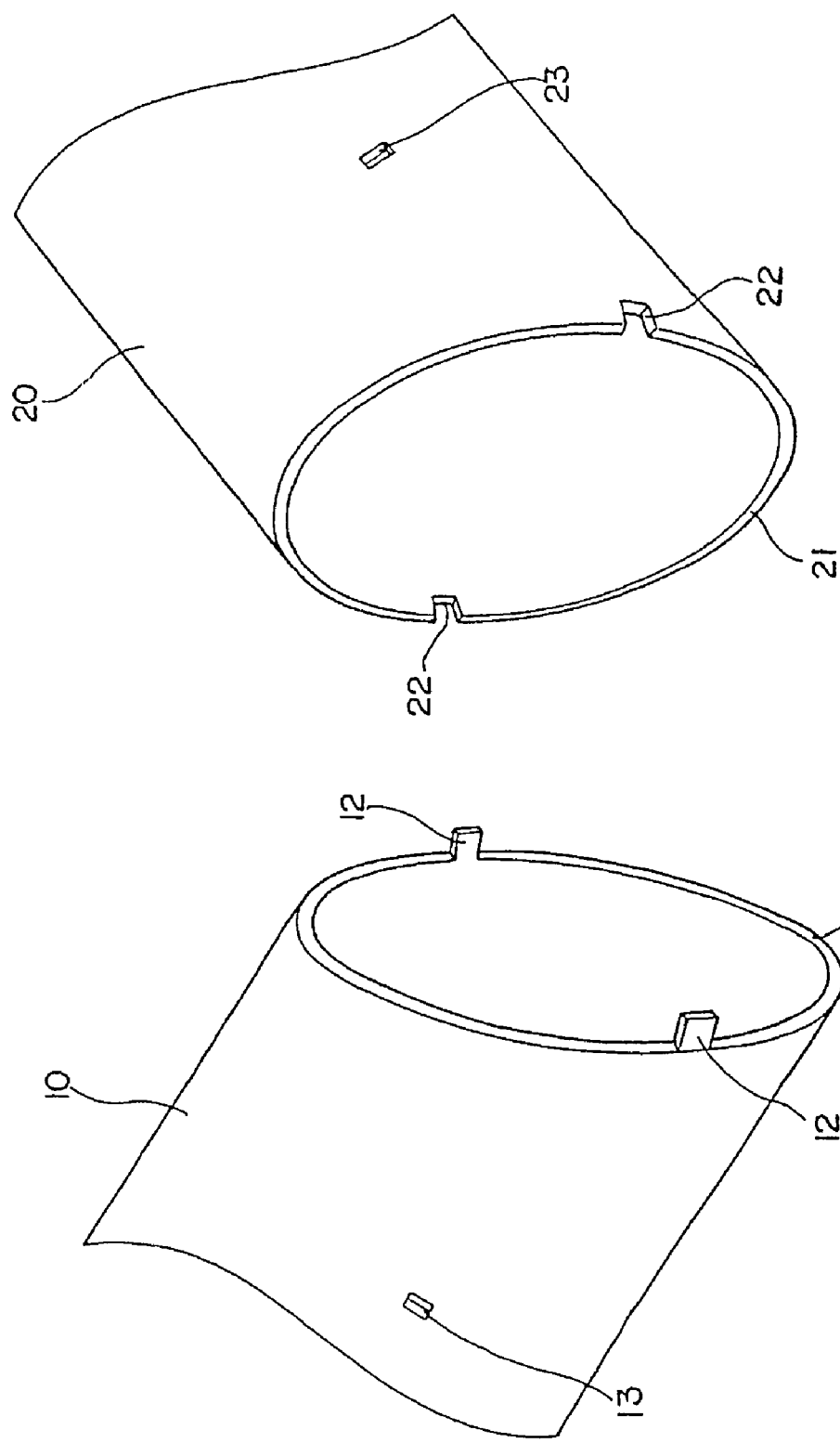
FIG. 2 is an explanatory view showing the detail of the joint structure of the two pipes.

FIG. 1 is a perspective view showing a joint structure of a pipe of the present invention, and FIG. 2 is an explanatory view showing the detail of a joint portion.

As shown in FIG. 1, a first pipe 10 and a second pipe 20 are directly joined to each other at their ends. And both the pipes 10, 20 are joined having an angle $\alpha_1$.

As shown in FIG. 2, the first pipe 10 has a joined end face 11 obtained by laser machining at a predetermined angle to an axis and tenons 12 projecting from the joined end face 11. In this preferred embodiment, the number of tenons 12 is 2, but the number, location and the like of the tenons may be selected as appropriate.

On a periphery of the first pipe 10, mortices 13 for receiving tenons of a third pipe and a fourth pipe, which will be described later, are provided.

The second pipe 20 has a joined end face 21 obtained by laser machining at a predetermined angle to an axis and a mortice 22 cut from the joined end face 21. This mortice 22 has a shape in which the tenon 12 of the first pipe is fitted, and the position of the mortice 22 is also formed by precision laser machining at a position corresponding to that of the tenon 12.

On the periphery of the second pipe 20, mortices 23 to which the tenons of the third pipe and the fourth pipe are fitted are also provided.

The joined end face 11 of the first pipe 10 and the joined end face of the second pipe 20 are in surface contact over the entire thickness of the pipes, and the first pipe 10 and the second pipe 20 are joined to each other by fitting the tenons 12 into the mortices 22.

Figure 3:
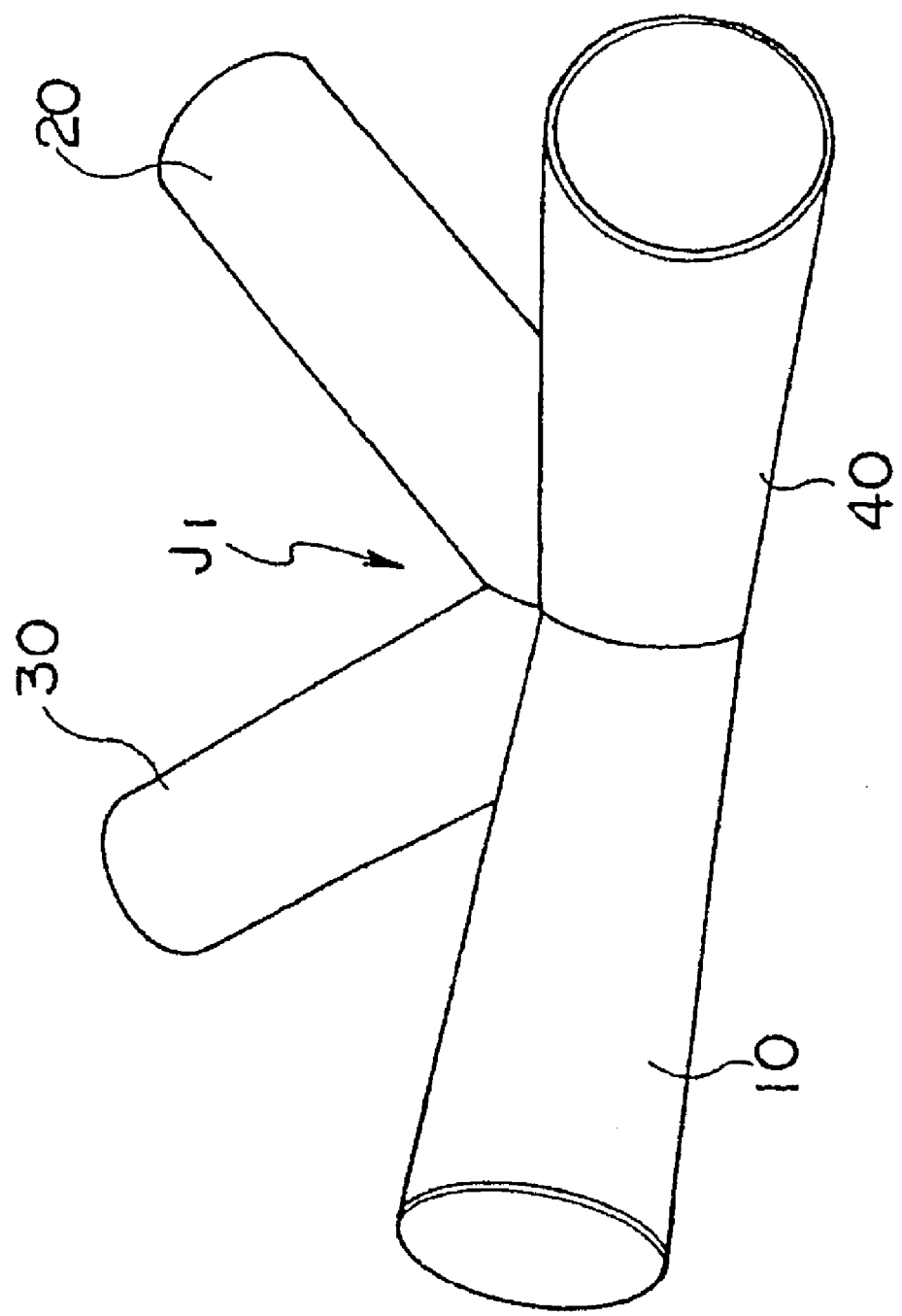
FIG. 3 is a perspective view showing a joint structure of four pipes.
Figure 4:
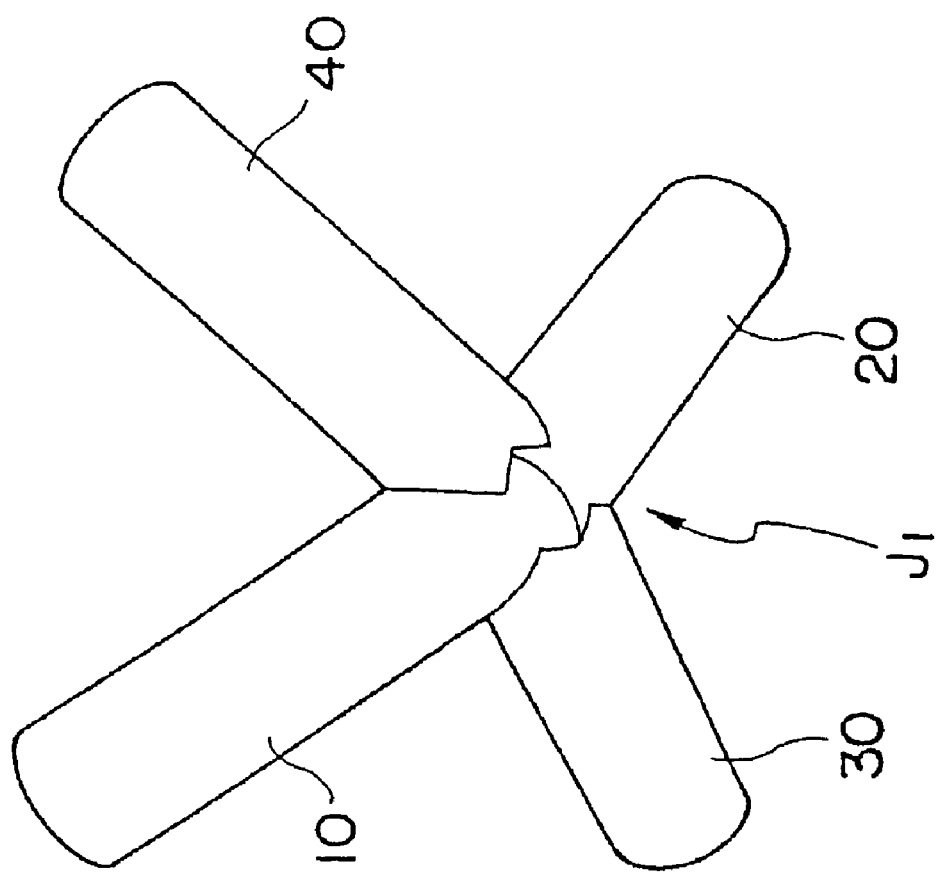
FIG. 4 is a perspective view showing a joint structure of four pipes.

FIGS. 3 and 4 show a joint structure $J_1$ further connecting the third pipe 30 and the fourth pipe 40 to the joined portion between the first pipe 10 and the second pipe 20.

FIG. 3 is a view looking down on the joint structure $J_1$ from above, while FIG. 4 is a view looking up on the joint structure $J_1$ from below. The joint structure $J_1$ can be formed in which the four pipes are joined at one location.

Figure 5:
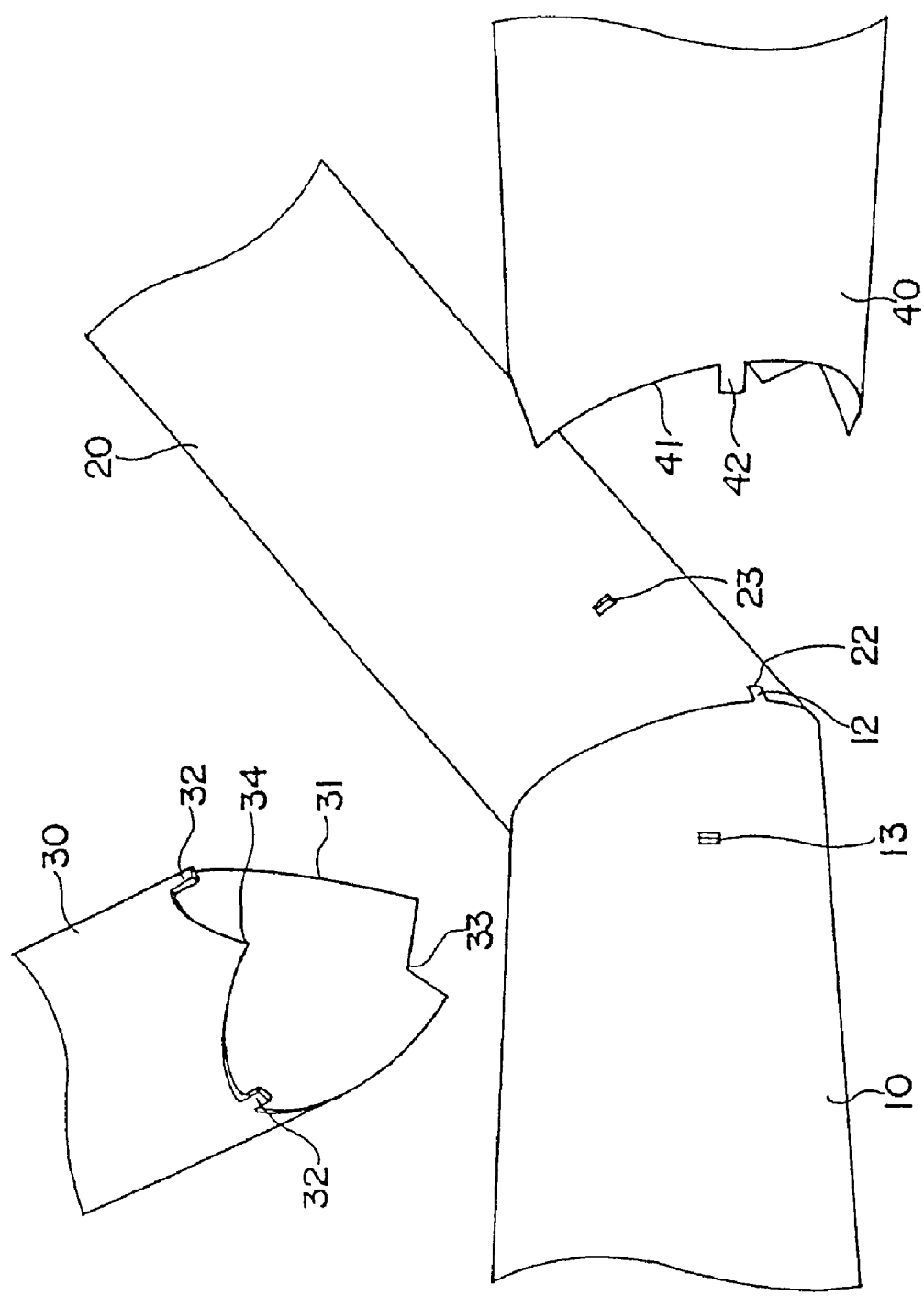
FIG. 5 is an explanatory view showing the detail of the joint structure in FIG. 3.

FIG. 5 shows a structure for joining the third pipe 30 and the fourth pipe 40 to the first pipe 10 and the second pipe 20 joined together.

The third pipe 30 has a joined end face 31 obtained by laser machining into the shape corresponding to outer circumferential surfaces of the joined first pipe 10 and the second pipe 20. And two tenons 32 are provided protruding from this joined end face 31. On the joined end face 31, projections 34 and recesses 33 corresponding to the joined end face of the other face to be joined are formed.

By fitting the tenon 32 of the third pipe 30 to the mortice 13 of the joined first pipe 10 and the mortice 23 of the joined second pipe 20 (both are provided on the back side of the figure), the third pipe 30 can be joined to the joint portion of the first pipe 10 and the second pipe 20.

The joined end face 31 of the third pipe 30 is joined in the surface contact state with the outer circumferential surface of the first pipe 10 and the outer circumferential surface of the second pipe 20.

The fourth pipe 40 also has a joined end face 41 and two tenons 42 obtained by laser machining into the same shape as that of the joined end face 31 of the third pipe 30.

And by fitting the two tenons 42 to the mortice 13 of the first pipe 10 and the mortice 23 of the second pipe 20, the fourth pipe 40 can be joined.

The joined end face 41 of the fourth pipe 40 is joined in the surface contact state with the outer circumferential surface of the first pipe 10 and the outer circumferential surface of the second pipe 20.

Figure 6:
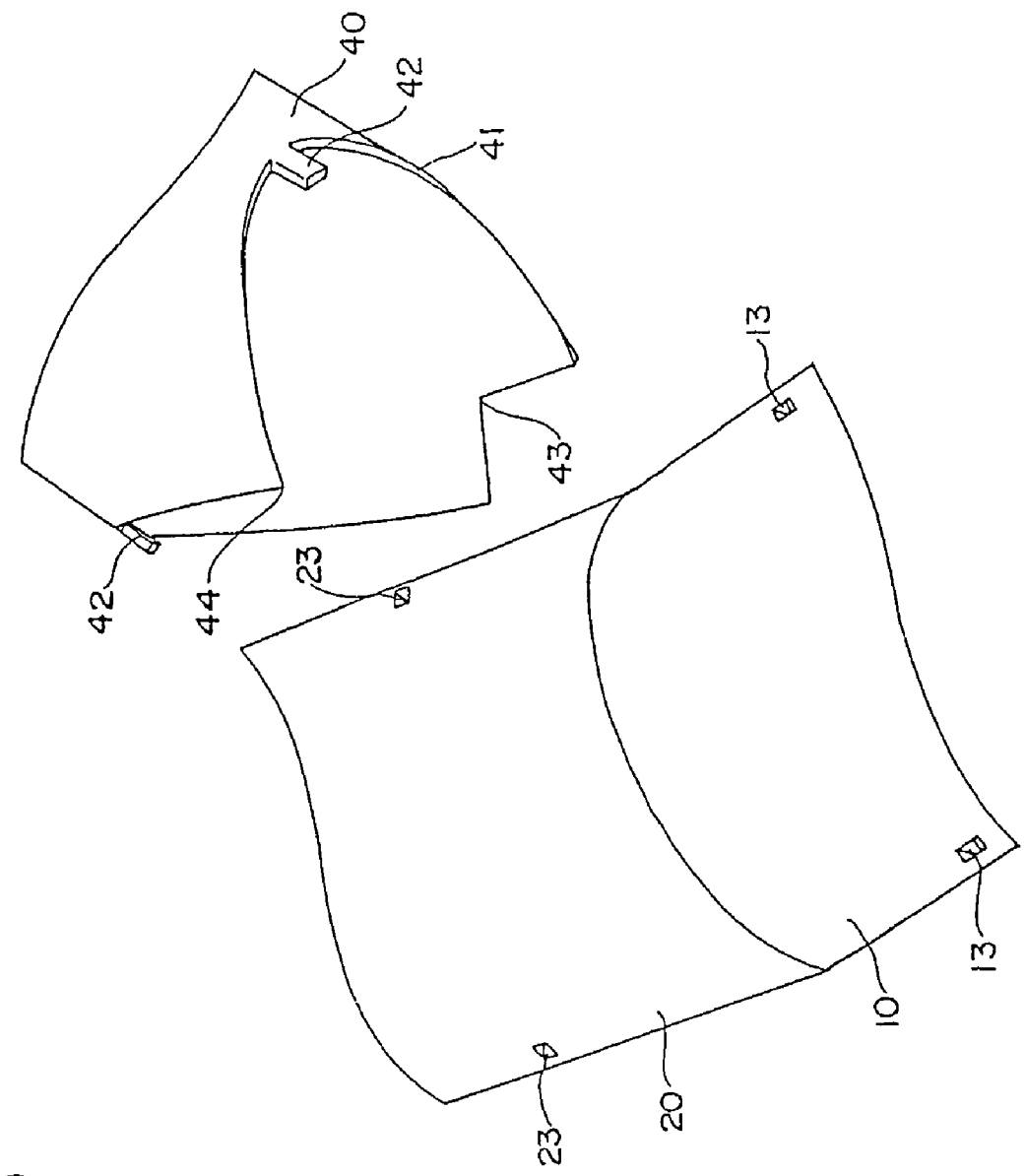
FIG. 6 is an explanatory view showing the detail of the joint structure in FIG. 3.
Figure 7:
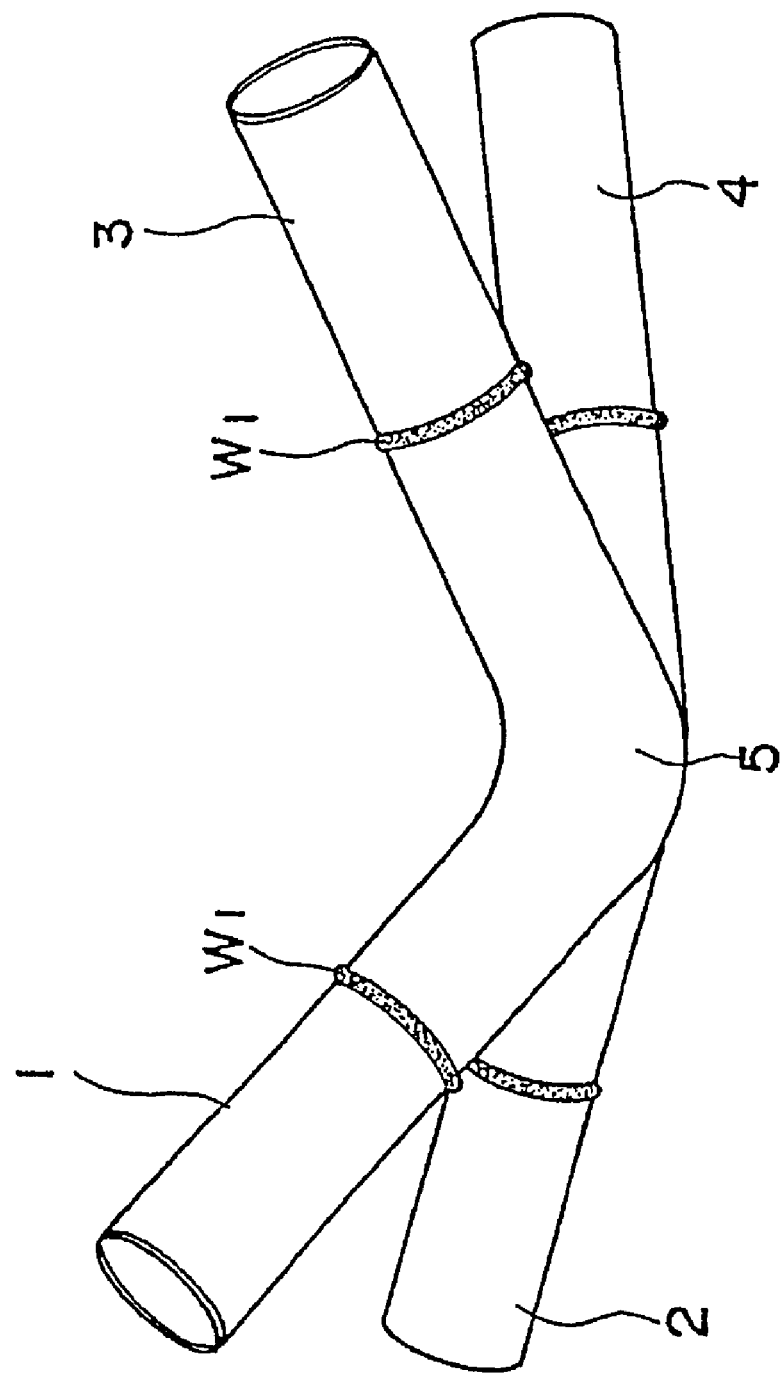
FIG. 7 is an explanatory view showing a conventional joint structure of a pipe.

FIG. 6 shows a state where the two tenons 42 of the fourth pipe 40 are opposed to the corresponding mortice 13 of the first pipe 10 and the corresponding mortice 23 of the second pipe 20.

According to the present invention, as mentioned above, such a joint structure can be constructed that the ends of the four pipes are collected and joined at one location.

Point welding or the like may be performed on the joined end face as necessary to obtain a firm joint structure.

What is claimed is:

1. A joint structure having a plurality of pipes, comprising:
   a first pipe having a tenon formed on an end face and a first mortice and a second mortice formed on an outer circumferential surface;
   a second pipe having a mortice formed on an end face and a first mortice and a second mortice formed on an outer circumferential surface;
   the end faces of the first and second pipes being joined to and in surface contact with each other over an entire thickness of the first and second pipes, the tenon on the end face of the first pipe being fitted to the mortice on the end face of the second pipe;
   wherein the tenon on the end face of the first pipe is fixed to the mortice on the end face of the second pipe, and the first pipe and the second pipe are fixedly joined to each other at a non-linear angle; and
   third and fourth pipes each having a first tenon and a second tenon on a respective end face;
   the third and fourth pipes respectively being joined to and in surface contact with each of the outer circumferential surfaces of the first and second pipes;
   the first tenon of the third pipe being fitted to the first mortice on the outer circumferential surface of the first pipe and the second tenon of the third pipe being fitted to the first mortice of the outer circumferential surface of the second pipe;
   the first tenon of the fourth pipe being fitted to the second mortice on the outer circumferential surface of the first pipe and the second tenon of the fourth pipe being fitted to the second mortice of the outer circumferential surface of the second pipe
   wherein the end faces of the first, second, third, and fourth pipes are collected at one location and joined to each other without requiring a joint member.

2. The joint structure according to claim 1, wherein the end faces of the pipes, the tenons, and the mortices are laser machined.

3. The joint structure according to claim 1, wherein
   the first pipe has a second tenon formed on the end face; and
   the second pipe has a second mortice formed on the end face,
      the second tenon on the end face of the first pipe being fitted to the second mortice on the end face of the second pipe.

4. The joint structure according to claim 1, wherein the third pipe and the fourth pipe form a non-linear angle, the first tenon of the third pipe being fixed to the first mortice on the outer circumferential surface of the first pipe and the second tenon of the third pipe being fixed to the first mortice of the outer circumferential surface of the second pipe; and the first tenon of the fourth pipe being fixed to the second mortice on the outer circumferential surface of the first pipe and the second tenon of the fourth pipe being fixed to the second mortice of the outer circumferential surface of the second pipe.

* * * * *